US009271475B2

(12) United States Patent
Shaver et al.

(10) Patent No.: US 9,271,475 B2
(45) Date of Patent: Mar. 1, 2016

(54) MULTI-FUNCTIONAL LEASH WITH SECURITY FUNCTION

(71) Applicant: Blake Shaver, Toronto (CA)

(72) Inventors: Blake Shaver, Toronto (CA); John Schmider, Etobicoke (CA); Jonathan Loudon, Toronto (CA); Rebecca Brunette, Toronto (CA)

( * ) Notice: Subject to any disclaimer, the term of this patent is extended or adjusted under 35 U.S.C. 154(b) by 0 days.

(21) Appl. No.: 14/404,470

(22) PCT Filed: May 30, 2013

(86) PCT No.: PCT/CA2013/000527
§ 371 (c)(1),
(2) Date: Nov. 27, 2014

(87) PCT Pub. No.: WO2013/177681
PCT Pub. Date: Dec. 5, 2013

(65) Prior Publication Data
US 2015/0107532 A1 Apr. 23, 2015

Related U.S. Application Data

(60) Provisional application No. 61/653,072, filed on May 30, 2012.

(51) Int. Cl.
*A01K 27/00* (2006.01)
(52) U.S. Cl.
CPC ............... *A01K 27/002* (2013.01); *A01K 27/00* (2013.01); *A01K 27/003* (2013.01); *A01K 27/005* (2013.01); *A01K 27/006* (2013.01)
(58) Field of Classification Search
CPC .................................................. A01K 27/003
See application file for complete search history.

(56) References Cited

U.S. PATENT DOCUMENTS

| | | | | |
|---|---|---|---|---|
| 6,024,054 A * | 2/2000 | Matt et al. | ...... | 119/796 |
| 6,095,094 A * | 8/2000 | Phillips | ...... | 119/792 |
| 6,581,548 B1 * | 6/2003 | Reid | ...... | 119/795 |
| 6,792,894 B1 * | 9/2004 | Donaldson | ...... | 119/856 |
| 7,980,201 B2 * | 7/2011 | Muelken | ...... | 119/792 |
| 8,156,901 B2 * | 4/2012 | Muelken | ...... | 119/720 |
| 8,683,959 B2 * | 4/2014 | Friedland | ...... | 119/792 |
| 2006/0254534 A1 * | 11/2006 | Lin | ...... | 119/792 |
| 2009/0229537 A1 * | 9/2009 | Muelken | ...... | 119/792 |

(Continued)

*Primary Examiner* — Kristen C Hayes
(74) *Attorney, Agent, or Firm* — Bhole IP Law; Anil Bhole

(57) ABSTRACT

A multi-function leash system incorporating anti-theft features is provided. The leash system includes a leash portion and a harness connectable to the leash portion. The leash portion includes an elongate leash, the elongate leash including at one end an attachment component, and at the other end a handle, wherein the handle is formed to be achieve a locked position in which the handle forms a closed loop, and an open position in which the handle is open at one end, and is operable to be wrapped around a fixed article, and then locked around the fixed article. The harness is formed to put on a pet, wherein the harness is adjustable to achieve a snug fit relative to the pet's body using one or more adjustable elements, wherein the harness is formed so that once the harness has been locked on the pet, and attached to the leash portion, the harness is difficult to remove from the pet's body. The pet is safe from theft when the harness is locked on the pet, the harness is connected to the attachment component, and the handle loop is looped around the fixed article suitable for fixing the system, and the handle is placed in the locked position.

11 Claims, 21 Drawing Sheets

(56) References Cited

U.S. PATENT DOCUMENTS

2013/0087105 A1* 4/2013 Cuthbertson et al. ......... 119/794
2013/0174616 A1* 7/2013 Allen, Jr. .......................... 70/30
2014/0083370 A1* 3/2014 Grandfield et al. ........... 119/792

* cited by examiner

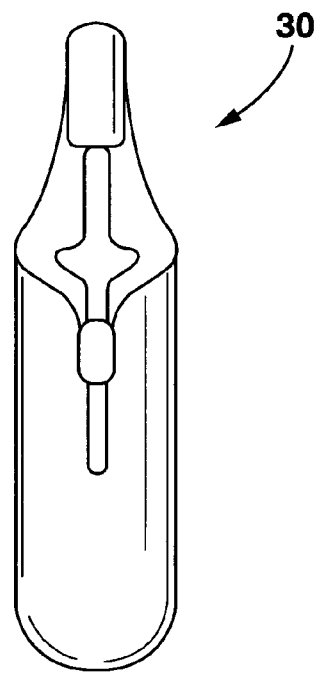 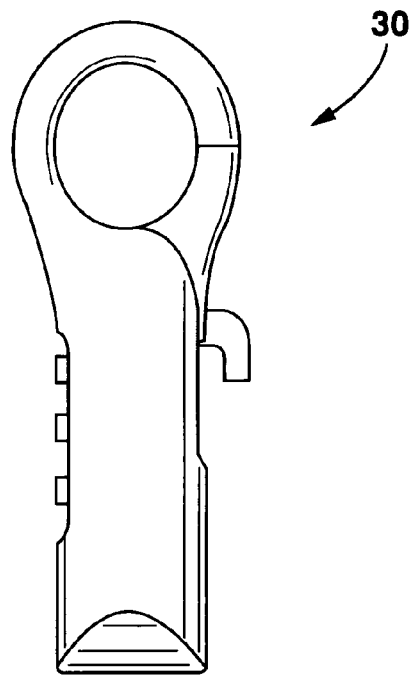
FIG. 12F     FIG. 12G

MULTI-FUNCTIONAL LEASH WITH SECURITY FUNCTION

PRIORITY

This application claims priority under 35 USC §119(e) of U.S. Provisional Patent Application No. 61/653,072, filed on May 30, 2012, the contents of which are hereby incorporated by reference.

FIELD OF INVENTION

This invention relates to dog leashes. More particularly this invention relates to multi-functional dog leashes.

BACKGROUND OF THE INVENTION

Various dog leash products exist, including multi-functional dog leashes. The main function of conventional dog leashes is to keep dogs and other pets within a specific distance of the owner. Some leashes are designed to maintain the pet within a distance defined by the length of the leash by holding a handle at one end of the leash, and also enable the owner to secure his/her pet to a fixed article such as a lamp post or parking meter to prevent the dog from escaping.

Few if any leashes, however, are designed to prevent theft of a pet. With dogs as an example, in order to run errands for example it is often necessary to leave the dog outside of a place of business that does not permit entry with dogs or other pets. This is when theft of dogs occurs. Some examples of when theft of a pet (especially dog) can occur: (a) when buying groceries, (b) when using the wash room, (c) stops at a convenience store, (d) while banking, (e) buying a coffee, (f) renting a movie, (g) leaving a dog in a backyard, (h) playing with children at the park, or (i) emergency situations.

Pet theft has become a significant problem. Pet theft increased in the United States in 2011 by 49% from the previous year, thus creating a need for safety and security related products. It is often said that a pet is a family member, and indeed when a pet is stolen this can be a traumatic event accompanied with a sense of emotional loss and loss of property. Part of what is driving theft of dogs is the significant resale value that can be obtained for dogs, and especially specific breeds. Also, more costly breeds are becoming more popular because of the overall increase in the amounts spent by pet owner in buying their pets.

There is a need for a leash device that minimizes the risk of theft.

As with all pet products, it is important to ensure that the product remains safe for use by the pet, and that it promotes the health of the pet.

Also, leashes are usually used when walking a pet. Walking pets raises the need of other possible functions such as storage and dispensing of litter bags, flashlights etc. While multi-function leash devices incorporating such features are known, these have generally not included a functional design. There is a need for a leash device that addresses the risk of theft and also incorporates other useful features as part of a multi-functional leash device.

It is noted that the inventors are unaware of any multi-functional leash device that incorporates theft protection features.

It should be understood that in key markets, the number of pet owners is increasing, and more significantly the amount of money that people are willing to spend on useful products directed at living with pets is also increasing significantly.

SUMMARY OF THE INVENTION

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

A multi-function leash system incorporating anti-theft features is provided.

In one aspect of the invention, a leash system incorporating anti-theft features is provided comprising: (A) a leash portion, including an elongate leash, the elongate leash including at one end an attachment component, and at the other end a handle, wherein the handle is formed to achieve a locked position in which the handle forms a closed loop, and an open position in which the handle is open at one end, and is operable to be wrapped around a fixed article, and then locked around the fixed article; and (B) a harness formed to put on a pet, wherein the harness is adjustable to achieve a snug fit relative to the pet's body using one or more adjustable elements, wherein the harness is formed so that once the harness has been put on the pet, and attached to the leash portion, the harness is difficult to remove from the pet's body; wherein the pet is safe from theft when the harness is put on the pet, the harness is connected and locked to the attachment component, and the handle loop is looped around the fixed article and placed in the locked position.

In another aspect, the handle includes a handle body, and the handle includes a loop portion that is fixed at one end to the handle body and open at the second end but lockable to the handle body by means of a lock integral to the handle.

In another aspect, the lock can be a combination lock or a key lock.

In another aspect, the loop portion can be looped around the fixed article and the open end of the loop portion is locked to the handle body so as to achieve the locked position of the handle.

In a still other aspect, the harness includes a bottom portion that is wrapped under the belly of the pet, and a top portion connected to the bottom portion by means of two or more straps that are adjustable such that the bottom portion and top portion are fitted around the torso of the pet, wherein the harness includes one or more metal loops that are led through an opening in the top portion, and once the leash portion is attached to the harness, the metal loops cannot be led through the opening again, thereby preventing removal of the harness from the pet when the leash portion is attached to the harness.

In a still other aspect, the harness further includes a rigid portion that prevents the removal of the harness by sliding the harness and attempting to push a leg of the pet through an opening defined by one of the straps that wrap around a leg of the pet.

In another aspect of the invention, the handle defines a handle body, and the handle body includes a receptacle, a door that opens to the receptacle, and a slot, wherein the receptacle receives a roll of refuse bags, wherein the door may be closed to enclose the roll within the handle body, and one end of the roll may be inserted through the slot for access to the bags from the outside.

In a still other aspect of the invention, the handle body incorporates a light device and light switch that may be turned on by a user.

In yet another aspect of the invention, the harness includes a light device for pet safety.

In another aspect of the invention, the loop and the leash portion each include a cable to resist cutting.

BRIEF DESCRIPTION OF THE DRAWINGS

The invention will be better understood and objects of the invention will become apparent when consideration is given to the following detailed description thereof. Such description makes reference to the annexed drawings wherein:

FIGS. 12f and 12g show an alternative carabineer design of the present invention.

Figure 1:
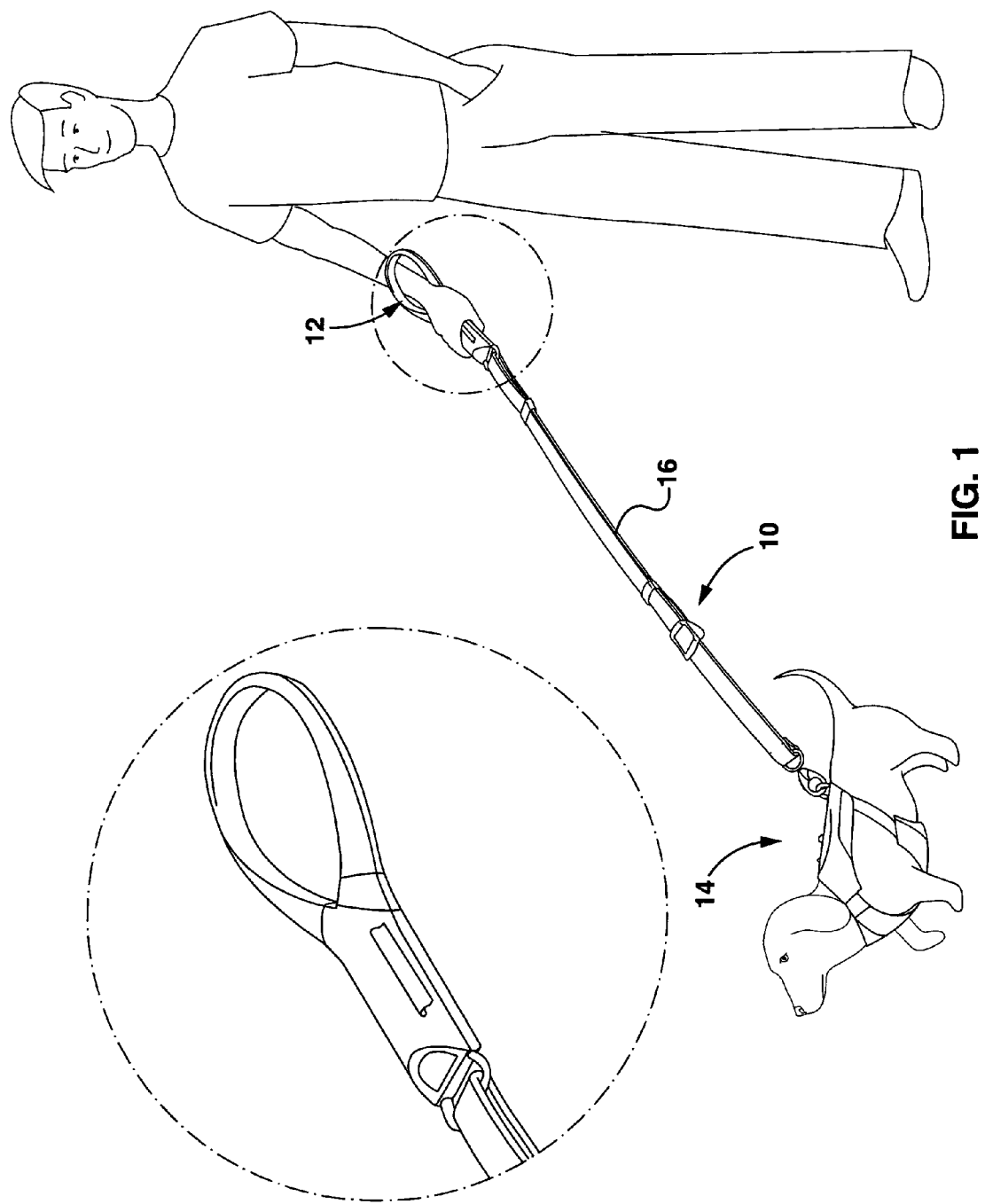
FIG. 1 is a representation of the leash system of the present invention in use.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention consists of multi-purpose leash system with anti-theft design features. As explained earlier, theft of pets and especially dogs is a growing problem. Moreover the fear of theft is for many owners interferes with their lifestyle and causes inconvenience in that they are reluctant to both walk their pet and also do errands by attaching their pet outside to a pole or other street fixture. Other times or other owners leave their pets outside of a store or bank for example, but are worried that their pet may be stolen. And in the cases where dog theft occurs, the loss of a pet is the loss of a family member.

The leash system of the present invention includes a number of features that cooperate to provide an easy to use system that includes important anti-theft features. In another aspect of the invention, a number of additional, convenient features have been added to the system to provide a multi-function leash system that provides significant convenience to users.

The leash system includes three portions: a handle portion or handle (12), a harness portion or harness (14), and a leash portion or leash (16) that is disposed between the handle (12) and the harness (14). The overall leash system can be understood by referencing FIG. 1. The handle (12) generally includes a body and a loop portion, and as shown in FIG. 1, the body and the loop in one aspect may be sized to enable an owner to place his/her hand through the loop and hold on to the body, for a firm grip.

Figure 2A:
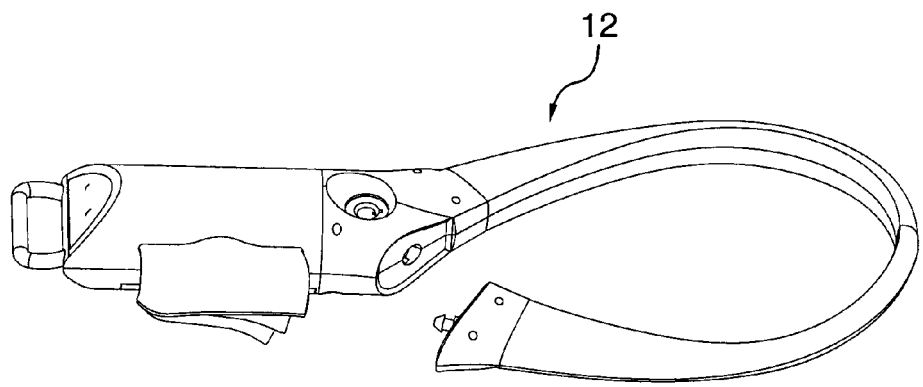
FIG. 2a is a representative view of the handle portion of the leash of the present invention.
Figure 2B:
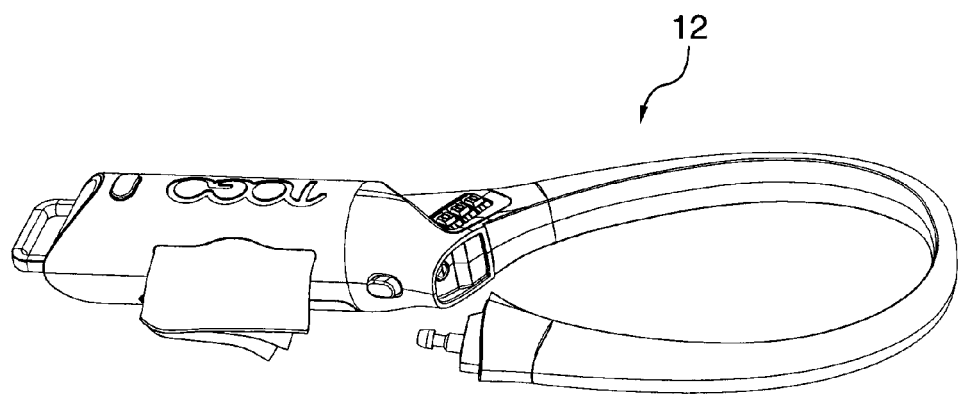
FIG. 2b is a representative view of the handle portion of the leash, in an another possible embodiment thereof.

FIG. 2a is a representative view of the handle portion (12) of the leash of the present invention, in one aspect thereof. FIG. 2a shows that the loop portion is designed to be fixed at one end and open at the second end but lockable to the adjacent area of the body of the handle, using a suitable lock system. FIG. 2a shows an embodiment with a key lock, and FIG. 2b shows an embodiment with an integrated combination lock.

Figure 3A:
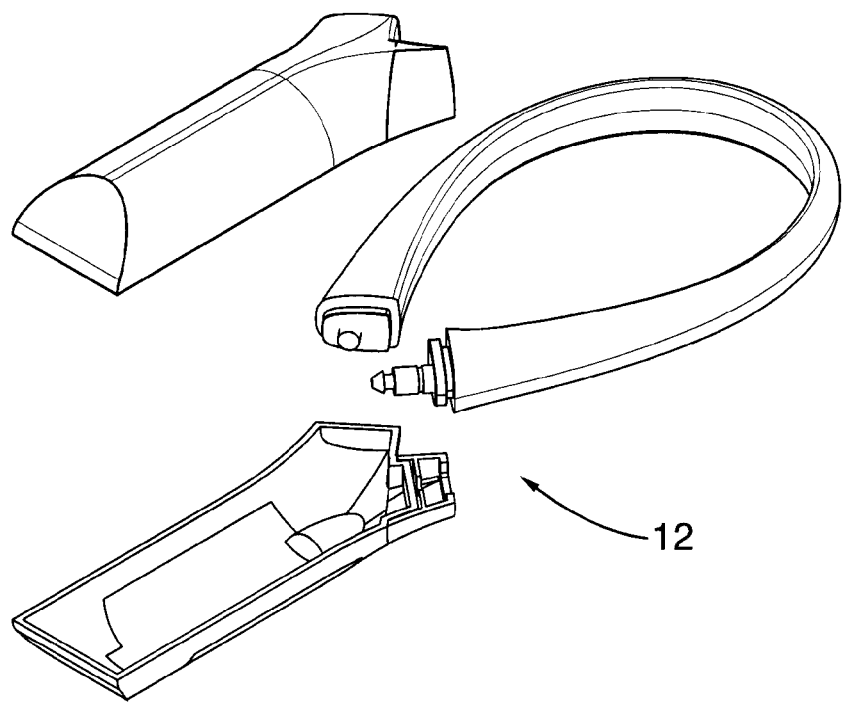
FIGS. 3a and 3b illustrate two different exploded views of the handle portion of the leash of the present invention.
Figure 3B:
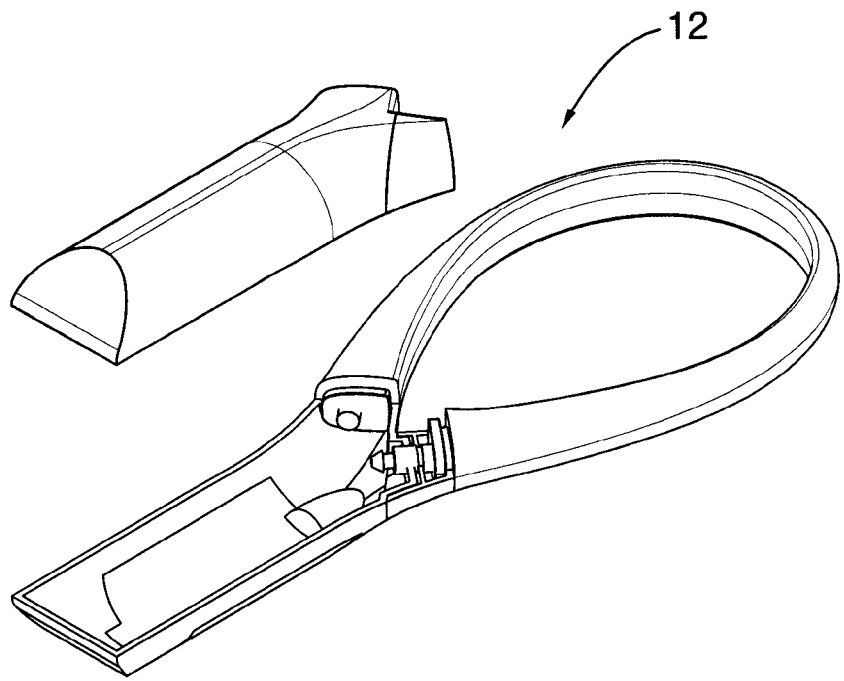
Figure 4:
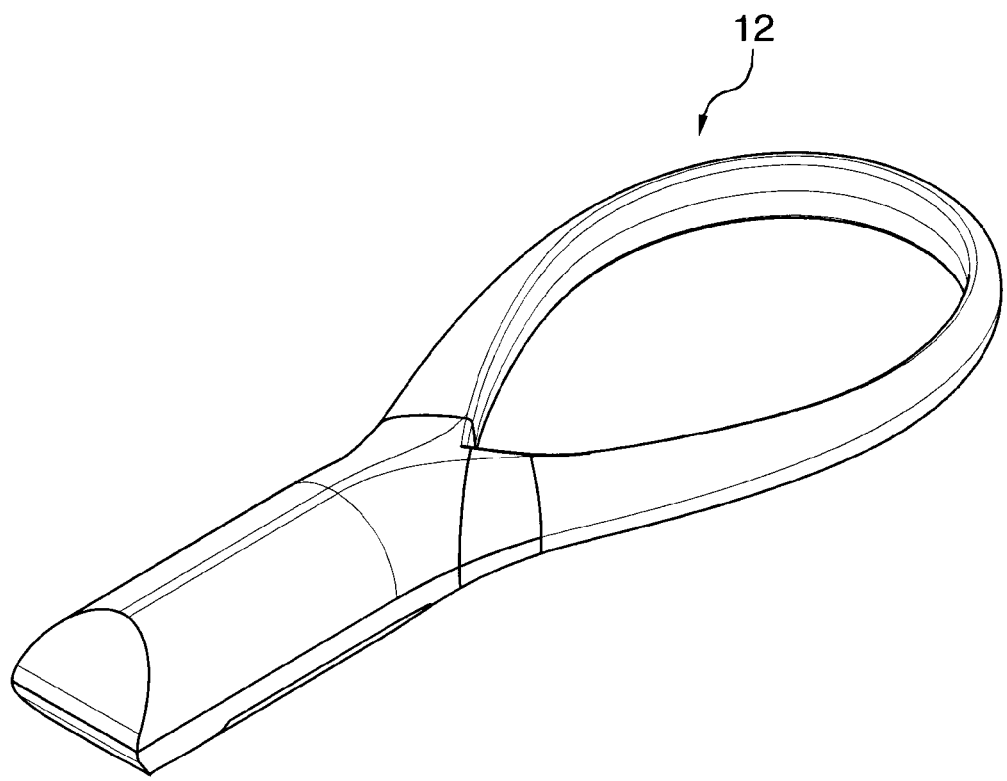
FIG. 4 is an outside view of the handle portion of the leash of the present invention.

FIGS. 3a and 3b in an exploded view show the interior of the construction of the handle portion (12), including the means for fixing the first end to the body of the handle permanently, and also the shaping of the body adjacent to second end to receive the locking pin.

In one particular embodiment, the lock system may include a latch mechanism that is formed to achieve two positions, a first open position in which the locking pin may be inserted within an opening formed by the latch mechanism, and a second closed position in which if the locking pin has been inserted, the latch mechanism surrounds the locking pin and blocks its removal from the opening.

Figure 6A:
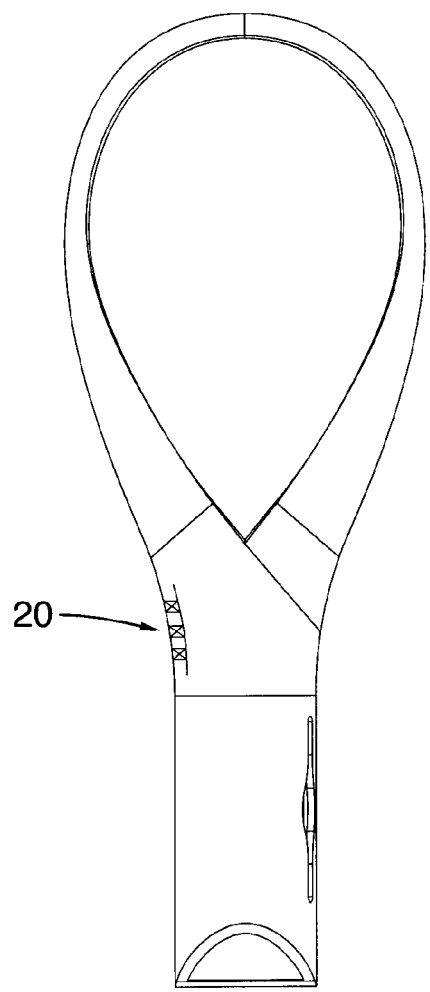
FIGS. 6a and 6b show different embodiments of the present invention, having different lock mechanisms.
Figure 6B:
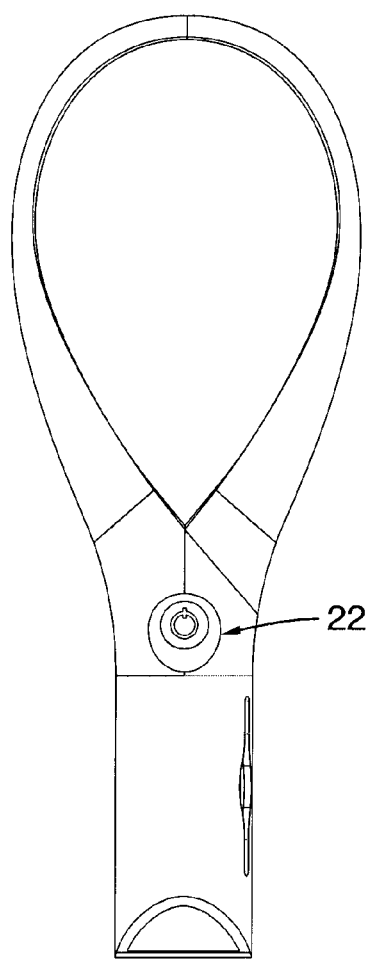

The lock system may include a variety of different mechanisms enabling a user to lock/unlock the lock system. For example FIGS. 6a and 6b illustrate two possible embodiments of the invention, each having a different mechanism for locking/unlocking the lock device. FIG. 6a shows a combination lock (20) integrated into the handle body. FIG. 6b shows a key hole (22) for receiving a key integrated into the handle body.

Generally speaking, in one embodiment of the present invention, the lock device used is similar to that of a bicycle lock. It should be understood that various other mechanisms for locking/unlocking the lock device are possible. Also it should be understood that various other lock types are possible, and the invention is not limited to a latch/catch pin type lock.

Other Possible Features of the Handle

Figure 5:
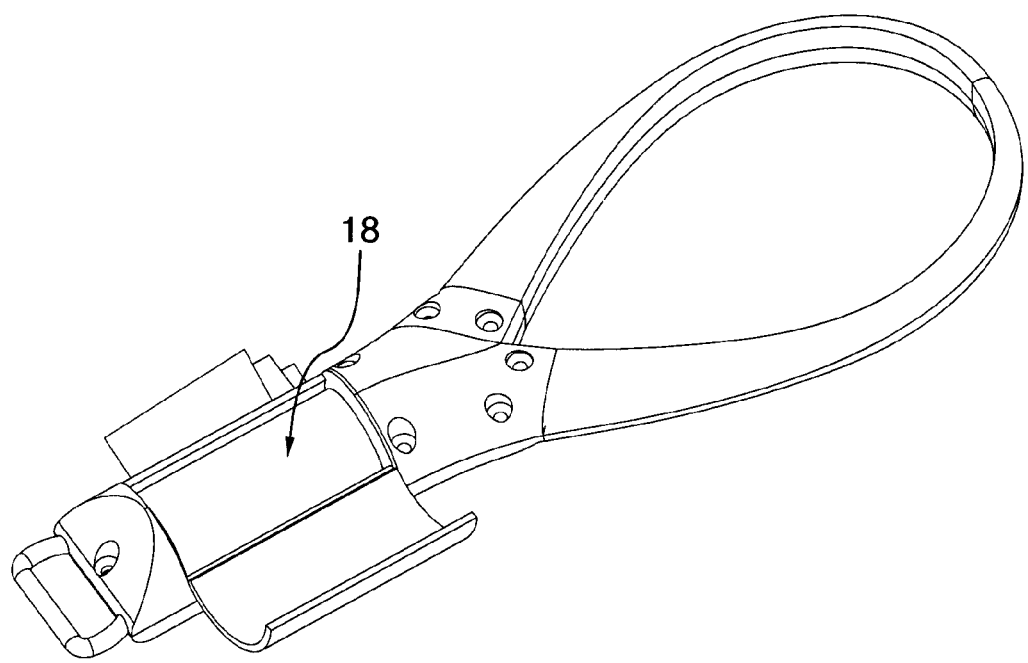
FIG. 5 is a bottom view of the handle portion of the leash of the present invention, showing the refuse bag receptacle, with the receptacle door in an open position.

The handle (12) may include other useful features. For example, as shown in FIG. 5, the handle body may include a receptacle (18) that is formed to receive a roll of refuse bags. The roll may be inserted through a door, which can be closed/clicked so as to remain in a closed position. As can be seen in FIG. 5, the handle body is also formed to include an opening or slot from which the end of the roll of refuse bags may be passed through so as to make the refuse bags accessible from the outside, once the door has been closed. Various mechanisms may be used to enable the door to be opened and closed such as a latch for example. Also an edge portion such as a serrated edge may be mounted adjacent to the slot so as to facilitate the tearing off of the refuse bags, one by one.

In addition as shown in FIG. 1, the handle body may integrate a flashlight, which may be activated by the user so as to improve visibility for example at night, and also for the safety of the user. A variety of suitable lighting technologies may be used an integrated with the handle body. The flashlight on the leash handle allows pet refuse to be found at night. The flashlight in the handle body may be implemented using an LED or incandescent bulb. It may be used for example to locate the pet at night when the pet is off leash for example.

Leash

Figure 7:
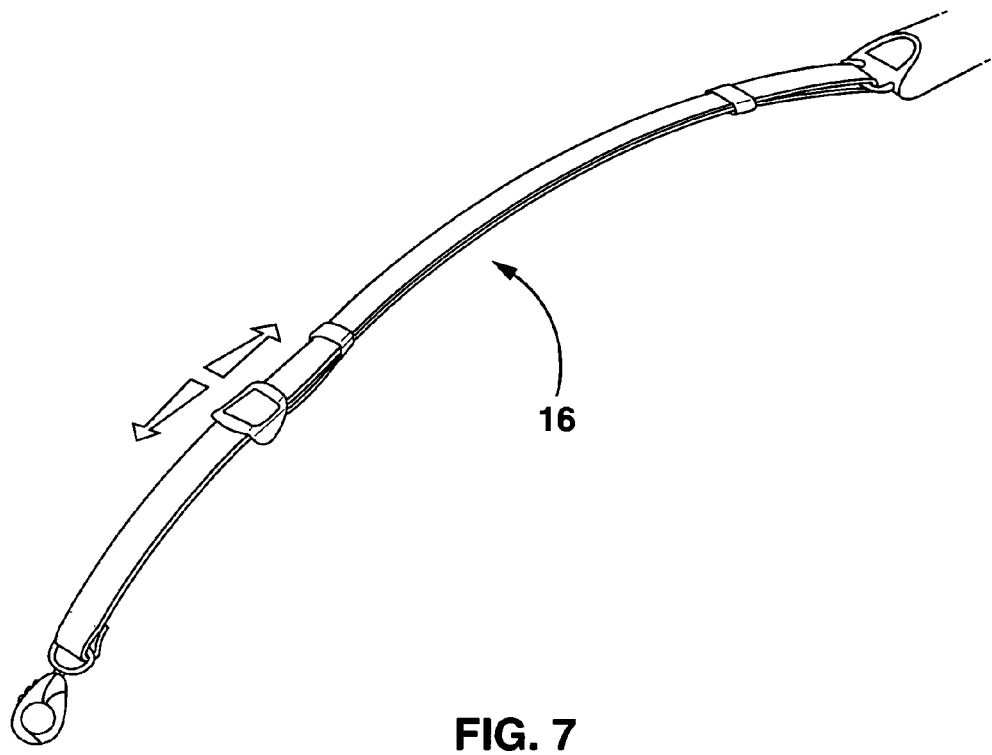
FIG. 7 is a view of the leash portion, in one embodiment thereof.
Figure 8:
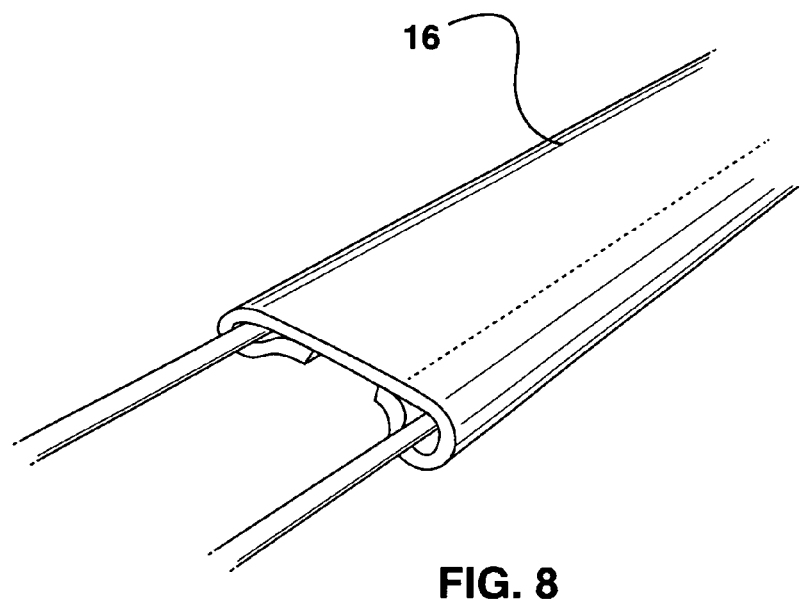
FIG. 8 is a cross-section of the leash portion, in one embodiment thereof.

One embodiment of the leash is shown in FIGS. 7 and 8. FIG. 7 illustrates a leash (16) that may be adjustable and also wraps around for example a bar fixed to the handle at one end, and includes a ring (24) for connecting to a carabineer for example at the other end. Various materials may be used for the leash, provided that it makes it difficult to cut the leash which would circumvent the security features of the leash system. In FIG. 8, a cross-section of the leash is shown, and it includes a cable inside the material used to form the leash, which make cutting of the leash difficult. Various other embodiments of the leash are possible.

For example, wire may be sewn in to edges of a strap forming the leash in order to prevent cutting and thereby theft.

In a particular embodiment of the invention, the leash adjusts from a short length of 2' for example while a pet is locked or as a training tool. The leash may also adjust to a longer length of 8' for example while a dog is locked up in the backyard or being walked at a farther distance from its owner or caregiver.

The leash (16) may include for example a strip of reflective material both to hide seams and also improve visibility. One or more sliders may be included to provide adjustability. One on more rigid rivets may be affixed to the leash (16) in order allow sliders to be used to maintain the leash in a particular adjusted position by means of friction, while allowing with force to slide the sliders over the rivets to further adjust the leash (16).

Harness

Figure 9:
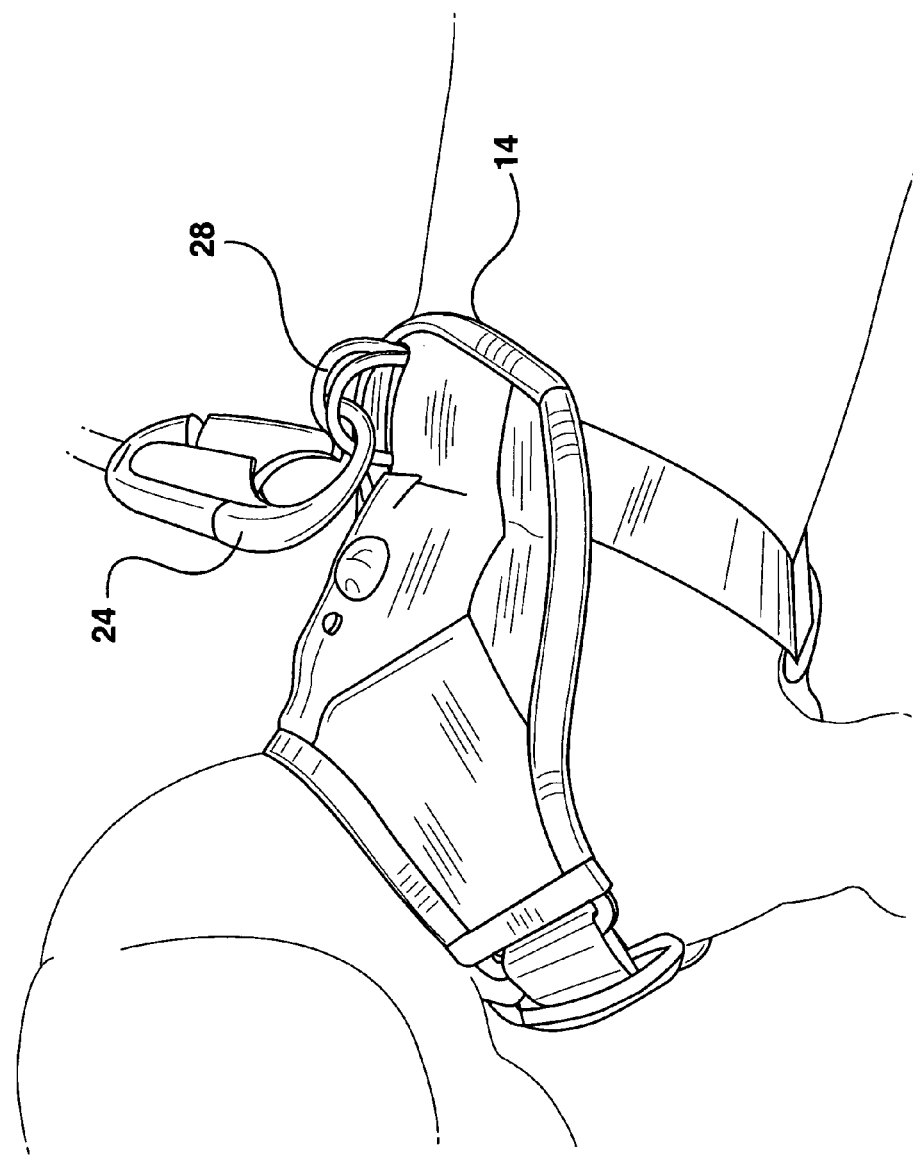
FIG. 9 is a view of the harness, illustrating attachment of the leash to the harness, in one embodiment thereof.

As shown in FIG. 9, the harness (14) is worn by a pet, and includes a part that enables the connection/disconnection of the leash to/from the harness. For example, as shown in FIG. 9, in one embodiment, one or more metal loops or rings (28) are integrated with the harness (14), which enables the connection of the leash (16) to the loops using a carabineer (30) for example. The harness (14) may be made of a material that is resistant to cutting and tearing, and the rings (28) are integrated with this material so as to resist removal.

Significantly, the harness (14) may incorporate features that enable the harness (14) to be put on the pet relatively easily by the owner or caregiver, and once the leash (16) is connected to the harness (14), removal of the harness from the pet is not possible without tools and the exercise of significant force. More details regarding a particular embodiment of the harness are provided below.

Figure 10A:
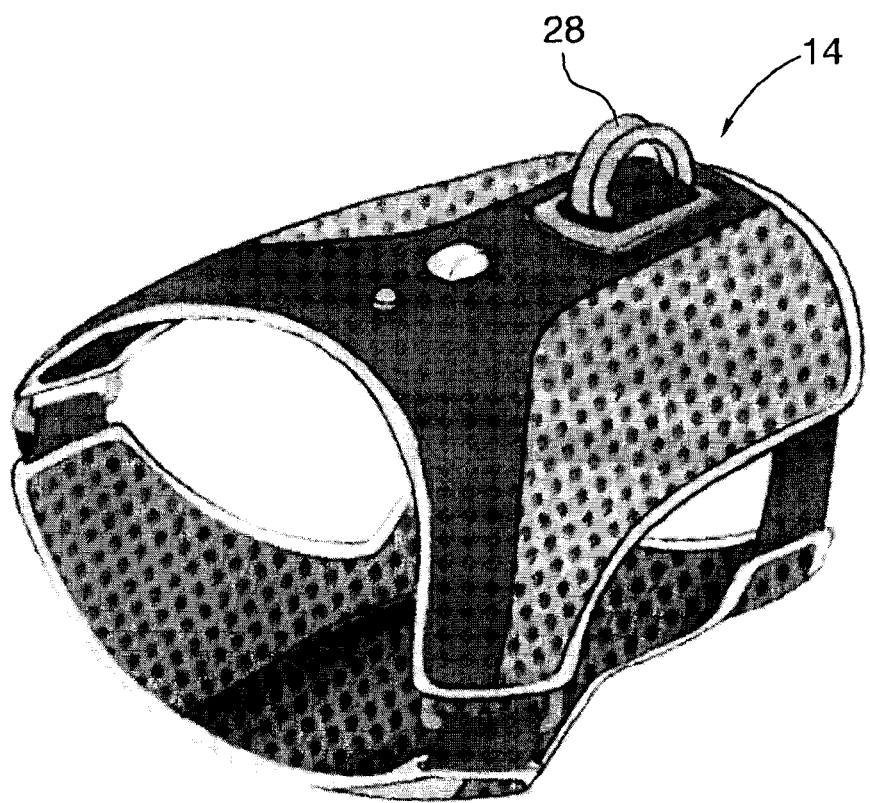
FIG. 10a shows a perspective view of the harness portion, in one embodiment thereof.
Figure 10B:
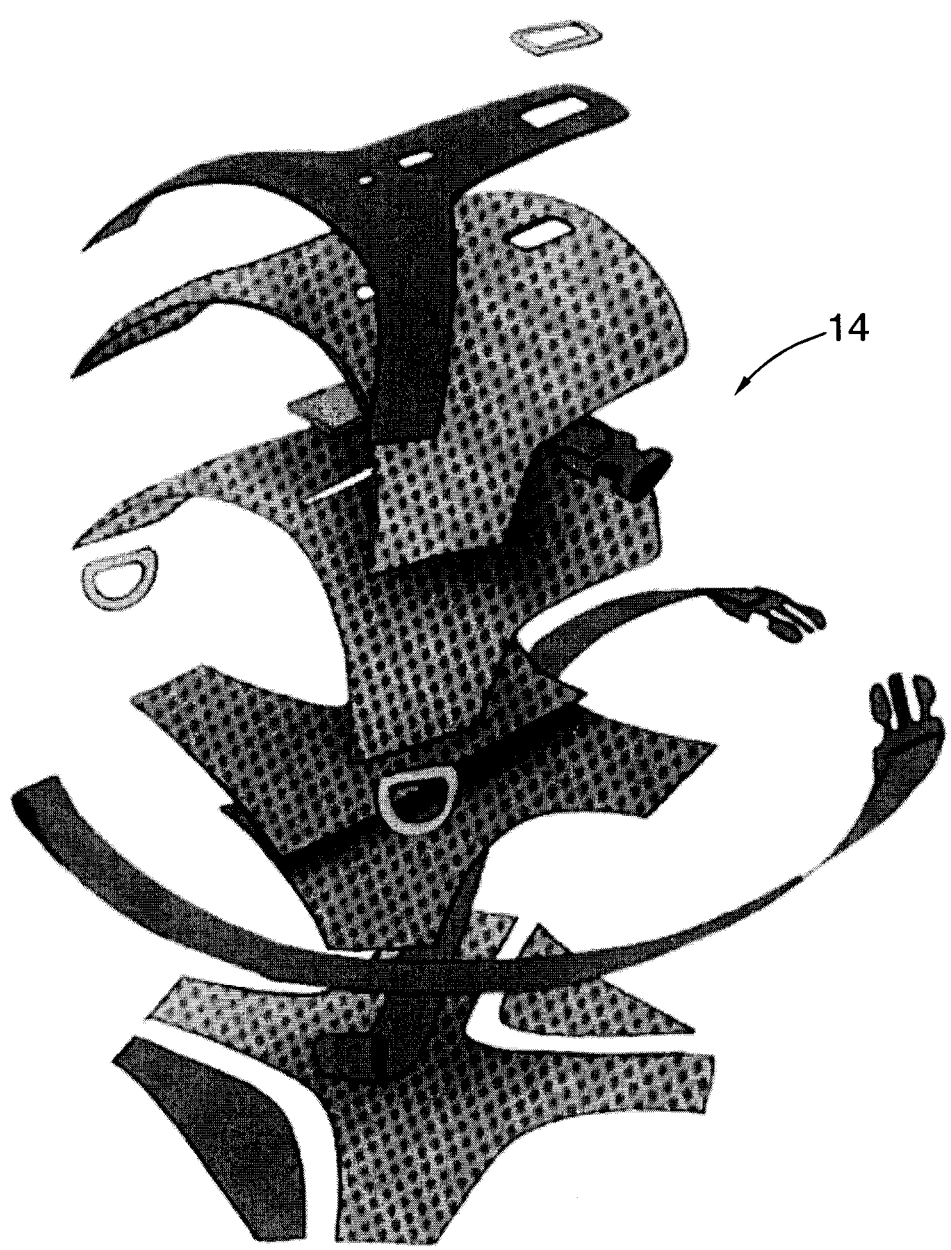
FIG. 10b illustrates an exploded view of the harness portion, in one embodiment thereof.

FIG. 10a illustrates a possible embodiment of the harness (14). FIG. 10b illustrates, in a deconstructed view of the layers and elements of the harness (14), in one embodiment thereof. Significantly, in one possible embodiment of the invention, the harness (14) includes straps for adjusting the harness (14) for a snug but comfortable fit around the torso of the pet. The harness (14), once put on the pet as shown in FIG. 9, wraps around the chest or belly and also below the neck, thereby once the harness (14) is in the fixed position, the dog cannot be removed from the harness (14), for example by manipulating his/her legs to be pulled through the harness (14). The snug fit of the harness (14) on the pet is an important mechanism for achieving this fixed position. Also, the straps used to adjust the harness (14) to achieve this snug position, as shown in FIG. 10b are integrated within the harness such that they are accessible when the harness is in the open position, but are not accessible when the harness is in the fixed position. This way a person seeking to remove or steal a pet cannot used the adjustable straps for this purpose. Another aspect of the fixed position achievable using the harness (14) is that, in one embodiment of the invention, the D-rings (28) shown in FIG. 10a need to be removed in order to enable the harness (14) to be removed from the pet. This of course is not possible when the leash is attached to the rings using for example the carabineer. This is feature therefore is another aspect of the secure function of the leash system.

It should be understood that the fixed position also prevents the dog from escaping, including for its own protection.

Figure 10C:
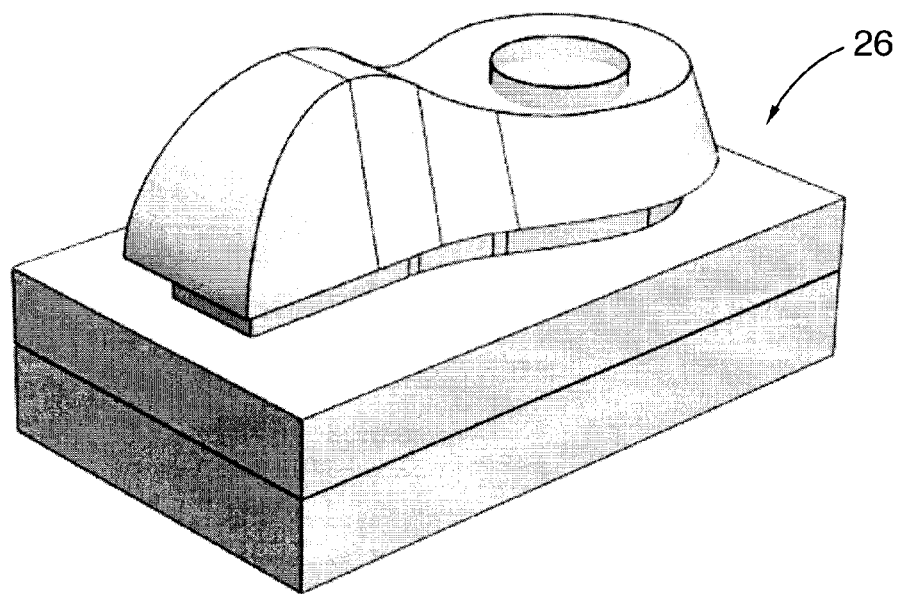
FIGS. 10c and 10d illustrate the LED design.
Figure 10D:
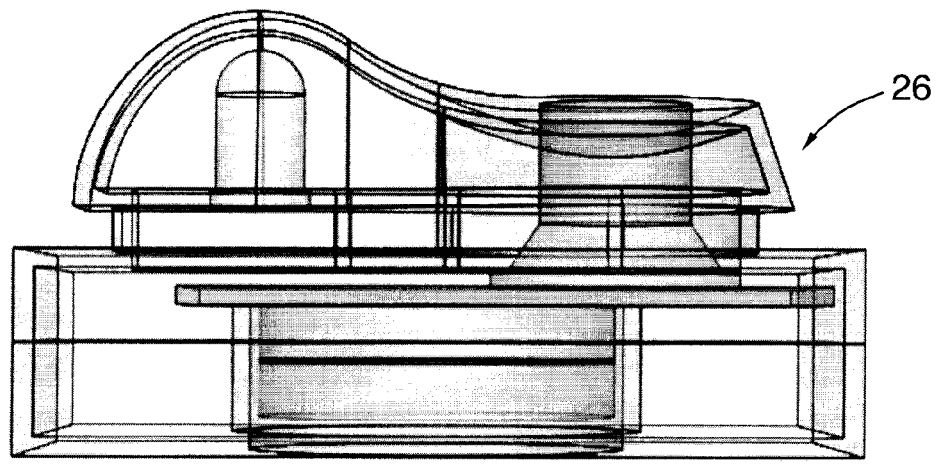
Figure 10E:
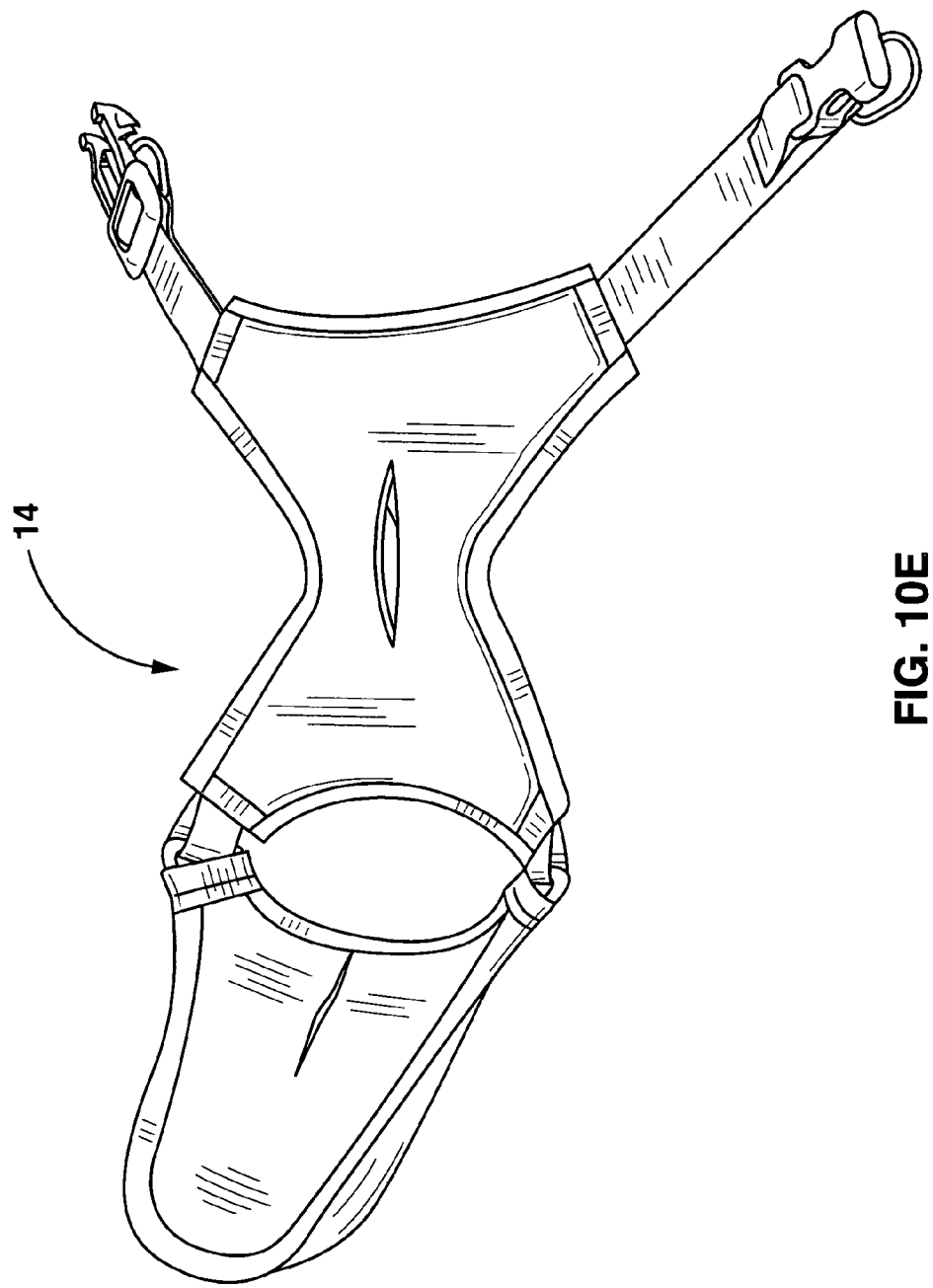
FIG. 10e further illustrates the harness, in one embodiment thereof.

FIG. 10e shows the harness (14) in a bottom view, in one embodiment thereof. FIG. 10e shows a criss-cross configuration of the harness (14), which is placed as shown in FIG. 10e under a pet's body, and then the adjustable straps are used for adjustment to a tight but comfortable fit.

Figure 10F:
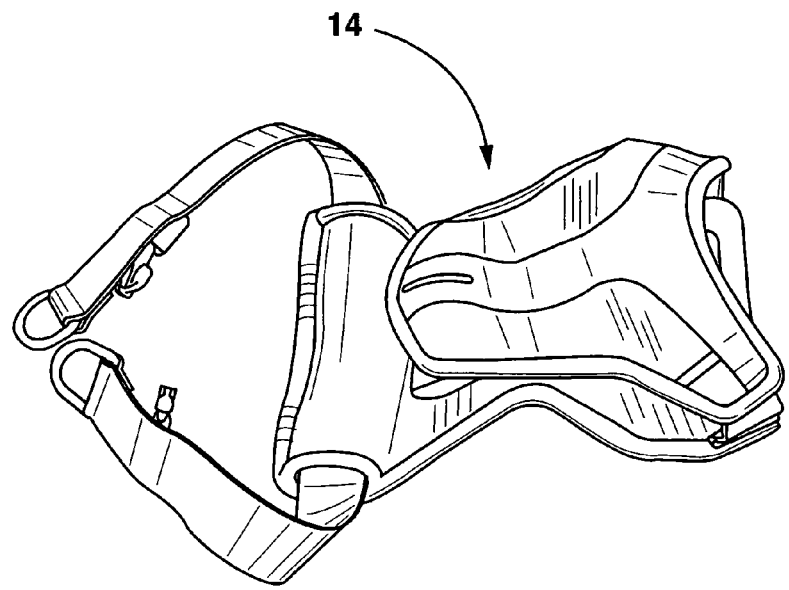
FIGS. 10f and 10g show an alternate embodiment of the harness.
Figure 10G:
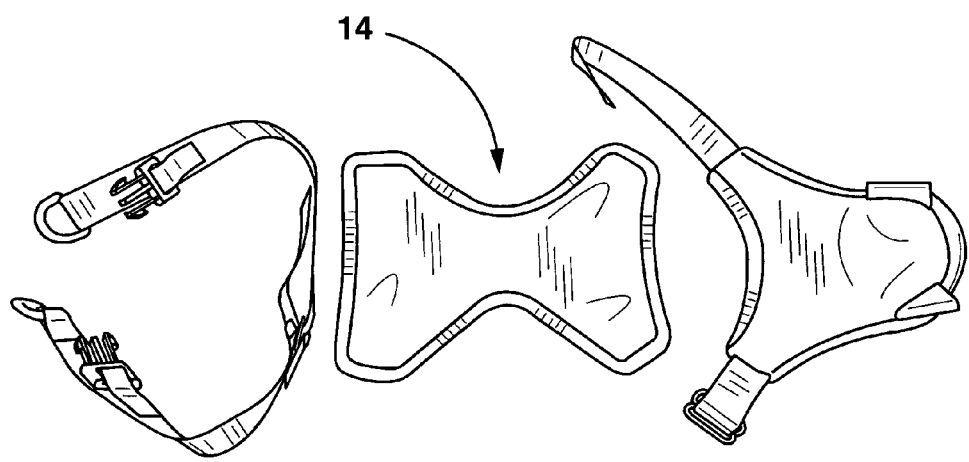

In a possible alternate embodiment of the harness, as shown in FIGS. 10f and 10g, the harness (14) may be made of a bottom portion and two separate loops that connect to the bottom portion, namely a first strap forming a loop for a dog's neck, and a second strap forming a loop for the dog's girth, thereby allowing for independent adjustment for example using one or more VELCRO™ tabs. Alternate embodiments are possible.

Figure 10H:
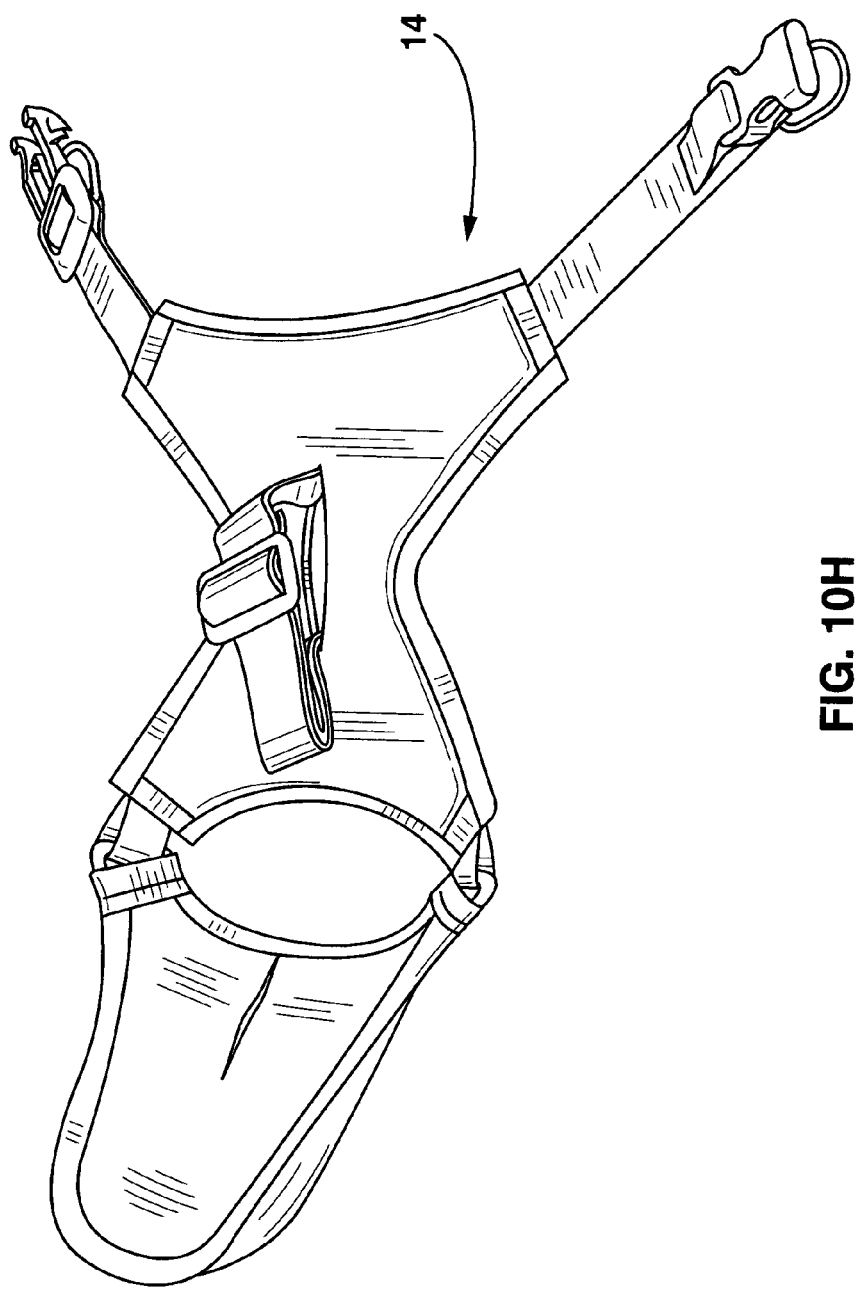
FIG. 10h illustrates the harness being assembled by a user, in one embodiment thereof.

FIG. 10h illustrates the adjustment of the straps to enable the snug fit, and then the strap is tucked away in the slot that is shown in FIG. 10e.

Figure 11A:
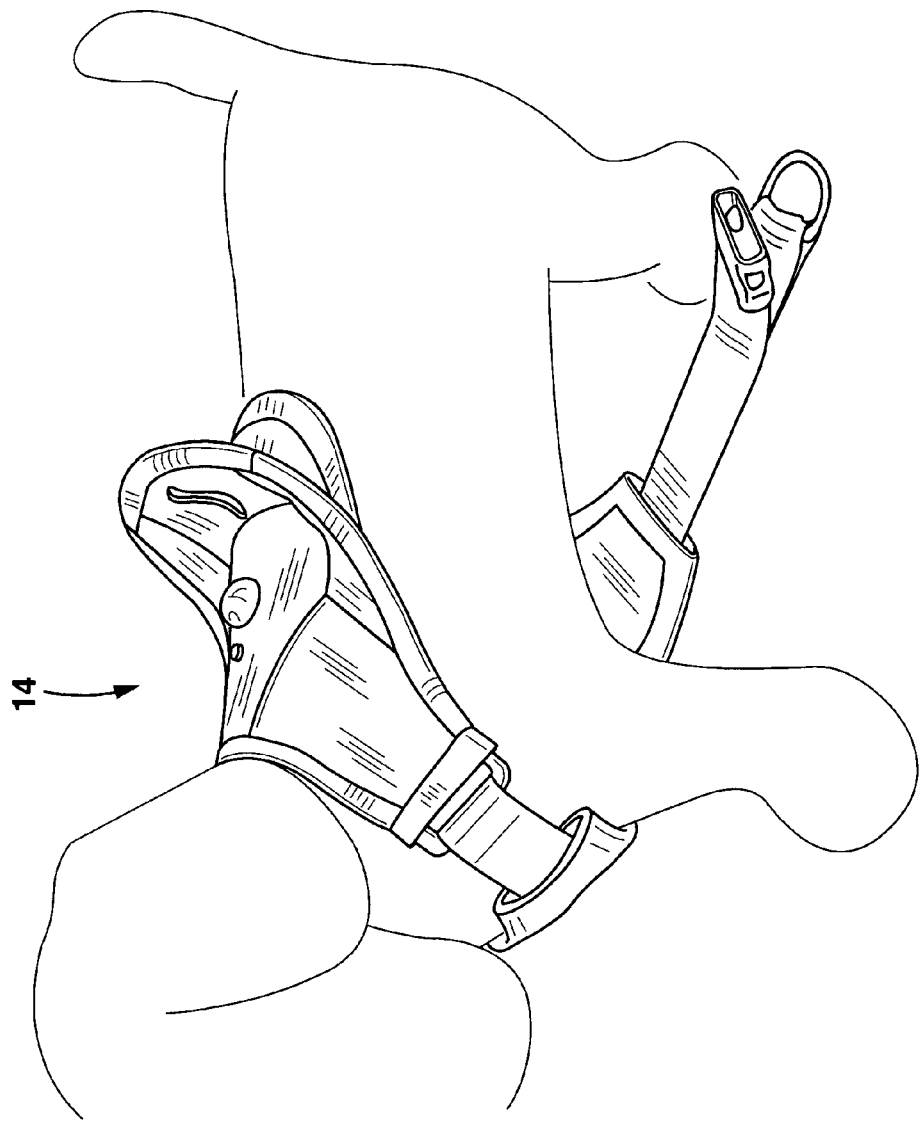
FIG. 11a illustrates the harness being mounted on a dog.
Figure 11B:
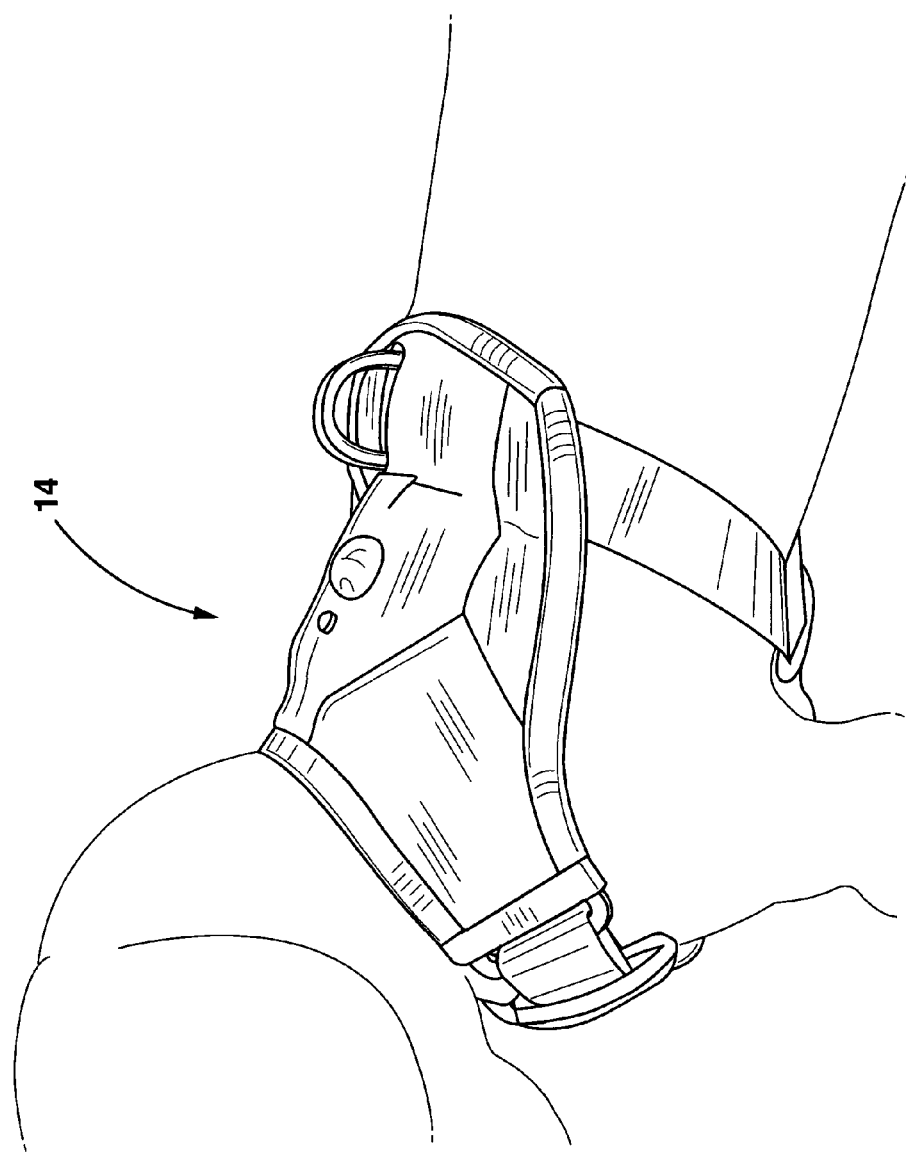
FIG. 11b further illustrates the harness being mounted on a dog.

FIG. 11a shows that the end of the strap has a connector and the ring that fits through the opening in the top of the harness (14). The connector is connected to a corresponding component and the top, and tucked away inside the harness, and the ring is fitted through the opening, as shown in FIG. 11b. Thus, when the ring is connected to the carabineer and cannot be removed through the opening, the dog cannot be removed from the harness (14) using the area shown in this drawing. These components, and the method of installation of the harness shown, are repeated for the other side of the pet.

Various elements may be included in the structure of the harness so as to further prevent theft. In one aspect, using force a thief may attempt to pull a dog's leg up parallel with its body and push its shoulder through the strap. This requires the whole harness to be folded forward. In one aspect, the harness includes a shank or some other portion of rigid material that is integrated with the harness and prevents the harness from being folded forward, thereby further preventing circumvention of the anti-theft features. For example, FIG. 10e shows an exploded view of the harness, and several possible layers of material. One layer may include a rigid shank layer, as an example of the implementation of this aspect.

In a possible alternate embodiment, as previously mentioned, the harness (14) may also include steel to make cutting off the harness (14) more difficult, thereby increasing theft resistance.

Figure 12A:
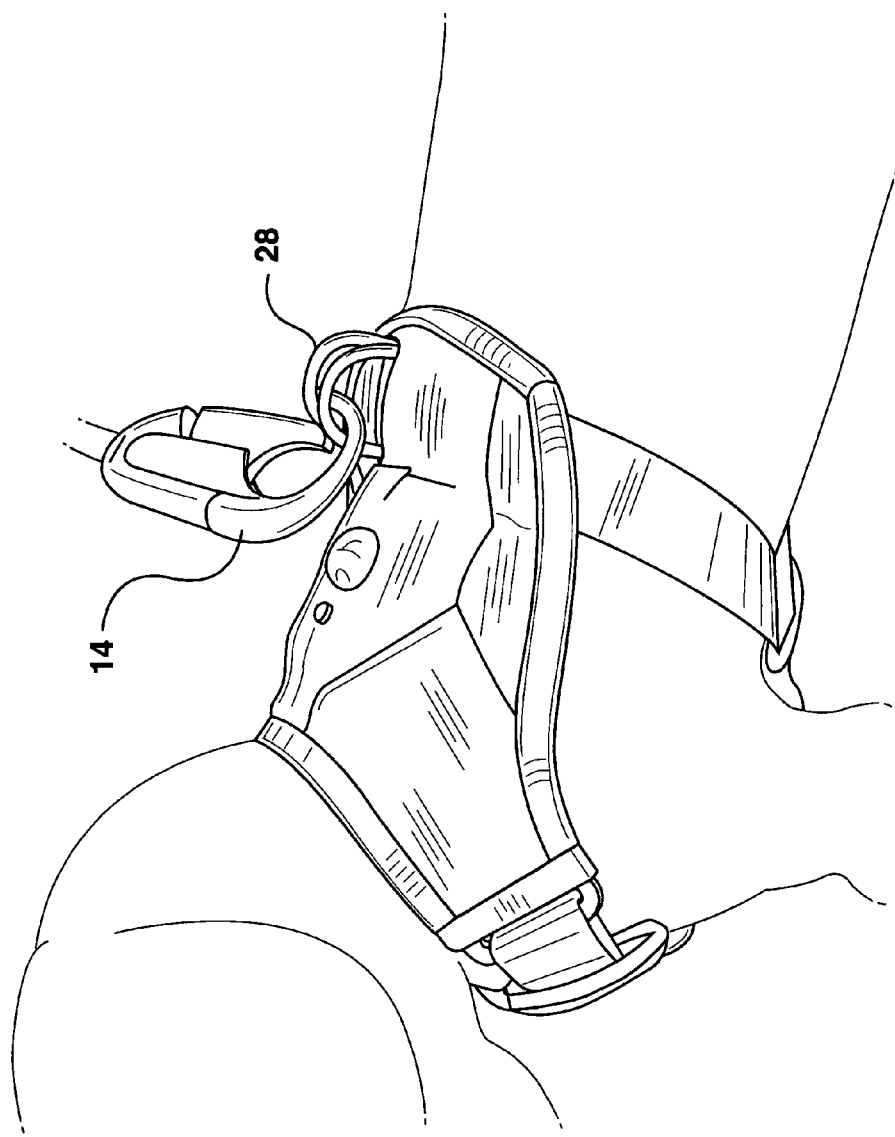
FIG. 12a illustrates the attachment of the leash to the harness, using the carabineer at the end of the harness portion.
Figure 12B:
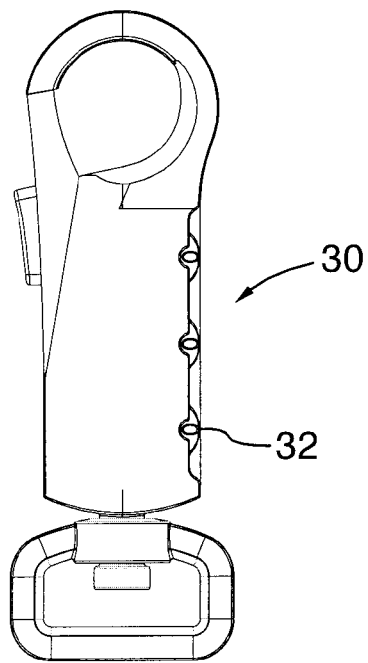
FIGS. 12b, 12c, 12d, and 12e show a possible carabineer design of the present invention.
Figure 12C:
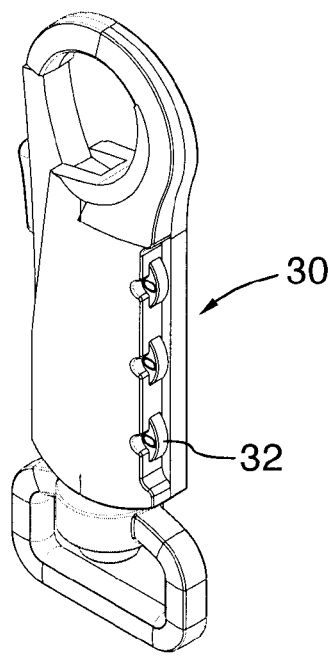
Figure 12D:
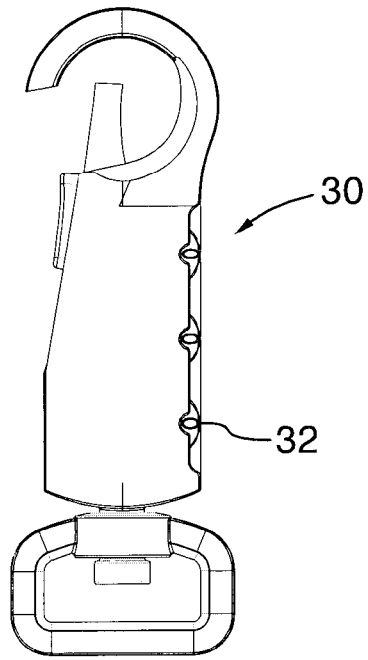
Figure 12E:
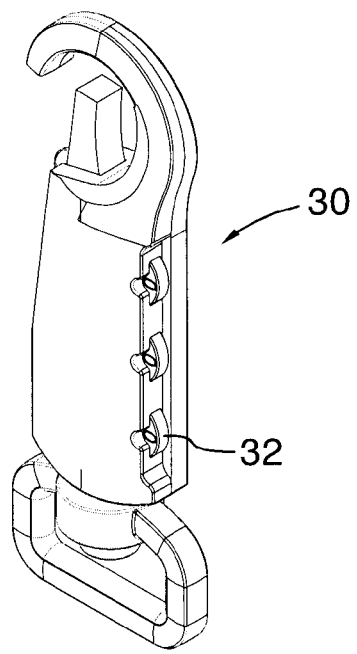

FIG. 12a illustrates the attachment of the leash to the harness, using the carabineer (24) at the end of the harness portion.

FIGS. 12b, 12c, 12d, and 12e show views of a possible carabineer (30) design, in this case a custom carabineer of the present invention. A swiveling connection may be included to connect to the harness (14). The carabineer shown includes a thumb activated latch for easy use.

Figures 12H, 12I:
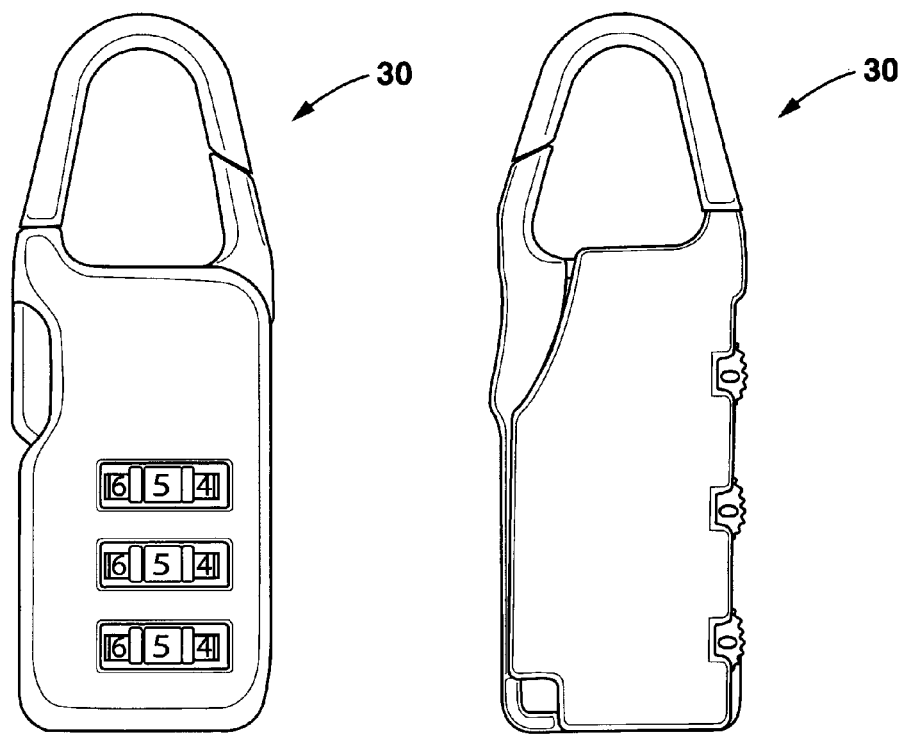
FIGS. 12h and 12i show a conventional carabineer design.

FIGS. 12f and 12g show alternative views of the carabineer (30) design. FIGS. 12h and 12i illustrate conventional carabineers (30), which may also be used with the present invention.

As shown in FIG. 1, and also in FIG. 9, the harness may also include a light in order to ensure that the pet is visible in the dark, thus improving pet safety (for example enabling drivers, pedestrians or bikers to see the pet. The light integrated with the harness enables the owners to locate the pet for example when the pet is off leash. The harness may include a light activation button to improve visibility of the pet in the dark, in order to improve safety. The harness may be made of a variety of materials, and may include for example a breathable air mesh for improved comfort for the pet. The harness may integrate a steel ring that is strong and bears the force of a dog pulling on the leash. The harness may also include reflective trim to improve visibility. The harness may include one or more rivets or snaps to attach coats to the harness for cold weather.

In another alternative, the harness may include a portion that receives a light that may be mounted on the harness or removed from the harness.

For example when walking a pet, or running with a pet when it is dark or getting dark. FIGS. 10c and 10d illustrate a particular light structure (26) that can be integrated with the harness. In particular, FIGS. 10c and 10d show a particular structure for an LED housing that may be integrated with the design. The box-like segment on the bottom opens for access to one or more batteries (for example 3V lithium batteries). The housing may be made of clear plastic so that the LED light is visible. The blue shape is a push button to activate the LED. The housing stays integrated with the harness because the undercut (groove) in the middle is "hugged" by the harness fabric which has a slot big enough to pass the upper portion of the housing up through it. The two halves of the housing are secured with screws to allow for battery replacement.

It should be understood that the harness may be sized and made adjustable for different sized pets, including for example dogs of various different girths.

It should be understood that the present invention is refers mainly to the use of the leash device for dogs, however, it should be understood that the invention may be used, or adapted for use, for a variety of other living beings including pets, where use of a leash may be desirable.

The handle may incorporate a flashlight, as previously mentioned, which may be engaged using a button disposed on the outside of the handle, such as a thermoplastic elastomer button that engages a switch board underneath to turn on the light.

Advantages

The leash system of the present invention provided enhanced security features that enable for example a pet owner to lock the leash to a pole, tree, fence or sign, in a way that cannot be undone without the applicable key and/or combination.

The handle is easy to open, and fasten, and then lock.

Having steel cabling running though out the leash, and also through the handle makes it difficult to cut and harness makes it will make it extremely difficult to cut with a knife or scissors.

Other leash systems exist that may include security features but these can be circumvented with relative ease.

The present invention by combining a specially designed harness with the leash improves on the state of the art.

The leash system is easy to use.

The leash system provides peace of mind and allows pet owners to leave their pets with confidence, thus improving the safety of pets, and the lifestyle of both pets and owners as there is more time to walk for the owner and for the pet, as the leash system permits multi-tasking by combining walks with pets with running errands. Before the present invention, many dog owners could not combine errands with walking their pet. In effect, the present invention provides more time to be active with one's pet.

The leash system is durable and easy to manufacture.

It includes other design features as described above, such as the integrated light and refuse bag receptacle to improve dog and owner safety, and also owner convenience.

Alternate Embodiments

Numerous extensions to the functionality of the apparatus are possible, without departing from the core design elements that provide the new and innovative elements of the present invention. It should be understood that different materials may be used to provide various components, including the leash portion. Various suitable light devices may be used. Various lock mechanisms may be used. The harness structure may be modified while maintaining its key function of difficulty of removal.

It will be appreciated by those skilled in the art that other variations of the embodiments described herein may also be practiced without departing from the scope of the invention. Other modifications are therefore possible.

We claim:

1. A leash system incorporating anti-theft features, comprising:
   (a) a leash portion, including an elongate leash, the elongate leash including at one end an attachment component, and at the other end a handle, the handle defining a handle body, the handle body including a receptacle, a door that opens to the receptacle, and a slot, wherein the receptacle receives a roll of refuse bags, wherein the door may be closed to enclose the roll within the handle body, and one end of the roll may be inserted through the slot for access to the bags from the outside, wherein the handle is formed to achieve a locked position in which the handle forms a closed loop, and an open position in which the handle is open at one end, and is operable to be wrapped around a fixed article, and then locked around the fixed article; and
   (b) a harness formed to put on a pet, wherein the harness is adjustable to achieve a snug fit relative to the pet's body using one or more adjustable elements, wherein the harness is formed so that once the harness has been put on the pet, and attached to the leash portion, the harness is difficult to remove from the pet's body;
   wherein the pet is safe from theft when the harness is put on the pet, the harness is connected and locked to the attachment component, and the handle loop is looped around the fixed article and placed in the locked position.

2. The leash system of claim 1, wherein the handle includes a handle body, and the handle includes a loop portion that is fixed at one end to the handle body and open at the second end but lockable to the handle body by means of a lock integral to the handle.

3. The leash system of claim 2, wherein the lock is a combination lock.

4. The leash system of claim 2, wherein the lock is a key lock.

5. The leash system of claim 2, wherein the loop portion can be looped around the fixed article and the open end of the loop portion is locked to the handle body so as to achieve the locked position of the handle.

6. The leash system of claim 1, wherein the harness includes a bottom portion adapted to be wrapped under the belly of the pet, and a top portion connected to the bottom portion by means of two or more straps that are adjustable such that the bottom portion and top portion are adapted to be fitted around the torso of the pet, wherein the harness includes one or more metal loops that are led through an opening in the top portion, and once the leash portion is attached to the harness, the metal loops cannot be led through the opening again.

7. The leash system of claim 6, wherein the harness further includes a rigid portion that prevents the removal of the harness.

8. The leash system of claim 6, wherein the straps are adjustable.

9. The leash system of claim 1, wherein the handle body incorporates a light device and light switch that may be turned on by a user.

10. The leash system of claim 1, wherein the harness includes a light device for pet safety.

11. The leash system of claim 1, wherein the loop and the leash portion each include a cable to resist cutting.

* * * * *